United States Patent [19]

Saletan et al.

[11] 4,247,532

[45] Jan. 27, 1981

[54] PURIFICATION OF ELECTROLYTICALLY-PRODUCED CHLORINE

[75] Inventors: David I. Saletan, La Porte; Heungwoo W. Chun, Houston, both of Tex.

[73] Assignee: Shell Oil Company, Houston, Tex.

[21] Appl. No.: 66,270

[22] Filed: Aug. 13, 1979

[51] Int. Cl.$^3$ .................. C01B 7/07; C01B 7/075; C01C 21/067; C25B 1/34

[52] U.S. Cl. .................. 570/234; 423/240; 55/71; 204/128; 423/500

[58] Field of Search .................. 423/240, 241, 481, 488, 423/500, 503; 55/71; 260/654 H; 204/128

[56] References Cited

U.S. PATENT DOCUMENTS

| | | | |
|---|---|---|---|
| 2,941,014 | 6/1960 | Rothweiler et al. | 260/654 H |
| 3,001,607 | 9/1961 | Eng et al. | 55/71 X |
| 3,568,409 | 3/1971 | Ferguson et al. | 55/71 |
| 3,881,893 | 5/1975 | Badhwar | 55/71 |

Primary Examiner—Earl C. Thomas

[57] ABSTRACT

A process is described which accomplishes improvement in the quality of the chlorine product of brine electrolysis. One or more objectionable impurities are eliminated from said chlorine through contact with hydrogen chloride, or an equivalent combination of hydrogen and chloride ions, in dilute solution.

20 Claims, 2 Drawing Figures

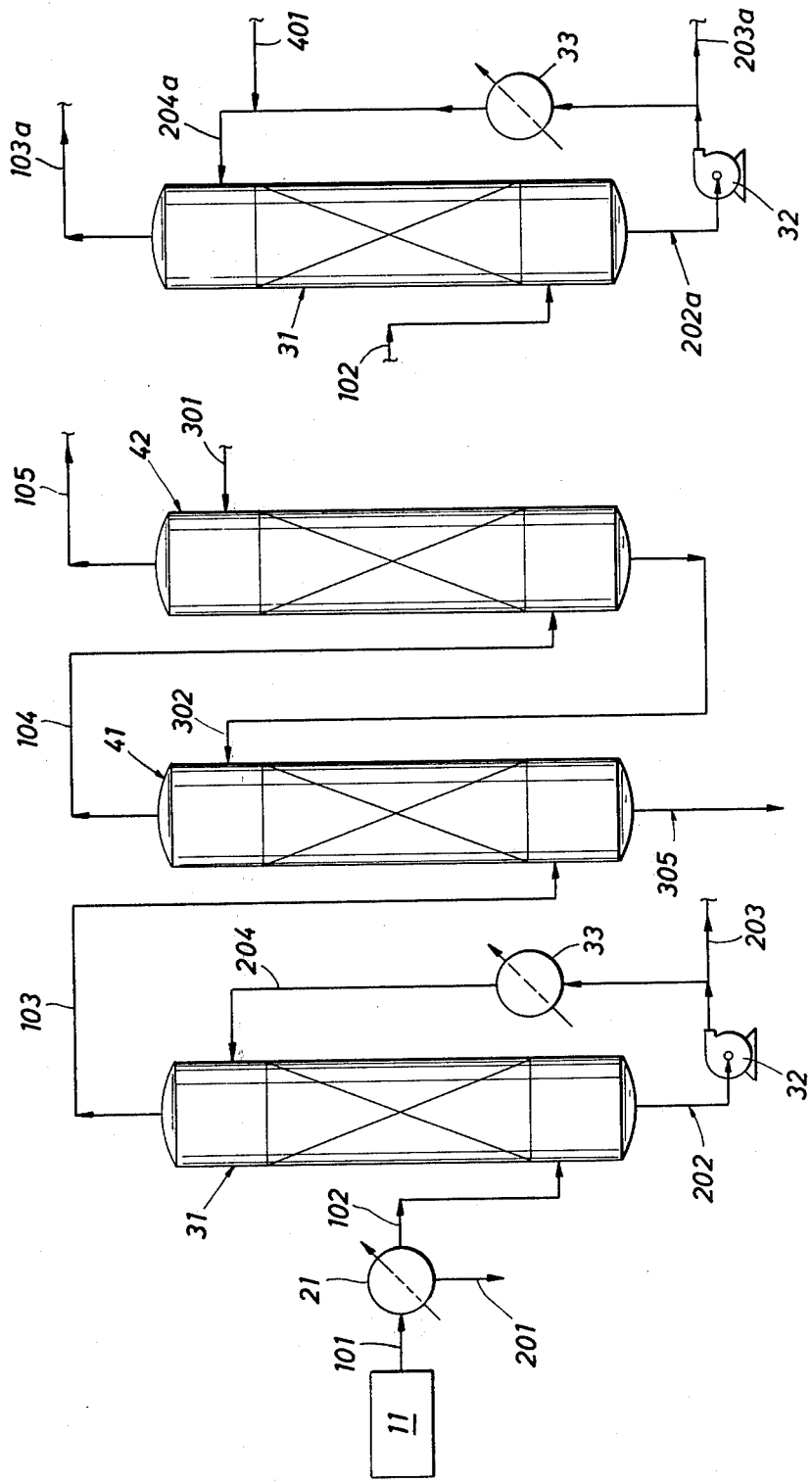

PURIFICATION OF ELECTROLYTICALLY-PRODUCED CHLORINE

BACKGROUND OF THE INVENTION

This invention relates to a method for improving the quality of electrolytically-produced chlorine, according to which the chlorine is contacted with a solution containing hydrogen chloride in specified quantity, or containing an equivalent combination of hydrogen and chloride ions. In certain preferred aspects, the invention relates to improvements in established methods for the cooling and drying of an electrolytically-produced crude chlorine vapor.

The electrolysis of common salt brine in particularly-designed electrolytic cells is estimated to account for well over ninety percent of world-wide commercial chlorine production. As an electric current is passed through the typical cell, it functions to convert sodium chloride and water into three primary products—chlorine, hydrogen, and caustic soda (sodium hydroxide solution).

It is generally known that the crude chlorine vapor product of brine electrolysis contains a number of impurities. Certain of the impurities arise from the presence of contaminants such as sodium carbonate, ammonia, and air in the brine feed to the cells. Others, for example, oxygen and hypochlorite and perchlorate compounds, are known to result from side reactions in the cells. Carbon dioxide and various organic chlorides are commonly formed in cells equipped with graphite anodes. Still other impurities, e.g., entrained brine mist and hydrogen, are carried into the chlorine as a result of imperfect separation of product and feed streams by the cells. Substantial quantities of water vapor are always found in the crude chlorine stream.

It is now general practice in the industry to subject the hot, wet chlorine vapor flowing from the electrolytic cells to cooling, drying and, optionally, liquefaction procedures, each of which also accomplishes some degree of chlorine purification. Under these procedures, which are so commonly employed as to be considered the industry standard, crude chlorine from the cells is first cooled from about 95° C. to about 15° C., either by direct contact of the crude chlorine vapor with water, or through surface heat exchange of the chlorine or through a combination of direct water contact and surface exchange. Most of the water vapor and brine spray are thereby removed. To yield a dry finished product the cooled gaseous chlorine is then passed in countercurrent contact with concentrated sulfuric acid to accomplish removal of essentially all of the remaining water vapor and brine entrainment. Finally, the chlorine gas may, if desired, be compressed and condensed to yield a liquid product. To a large extent, the more volatile impurities, e.g., hydrogen, oxygen, nitrogen, and carbon dioxide, remain in the vapor state following liquefaction and are thus separated from the finished liquid chlorine.

The principal use of electrolytically-produced chlorine is in the chemical industry, where it is employed as an important reactant in organic and inorganic synthesis processes. In the course of an investigation relating to the use of chlorine for such purposes, it has been found that one or more impurities, which are present in chlorine produced through the electrolysis of brine and which are not effectively removed by treatment of the chlorine according to common cooling, drying and liquefaction procedures, have a notable adverse affect upon the performance of the chlorine in certain organic synthesis reactions. Although these one or more impurities, which have not been conclusively identified, are believed to be present in the chlorine only in very small quantity, i.e., on the order of 5 to 300 ppm, they have been found to have a dramatic effect upon the selectivity in the reactions of certain organic species with chlorine to yield desired reaction products. The primary object of this invention is improvement of the quality of electrolytically-produced chlorine through the effective removal of these one or more impurities.

It has been stated that the invention generally relates to a process in which electrolytically-produced chlorine is contacted with liquid solutions comprising small quantities of hydrogen chloride. It should now also be noted in this regard that hydrogen chloride (HCl) is conventionally utilized for a number of purposes in the course of conventional electrolytic chlorine manufacture from brine. For instance, HCl is generally added to the brine feed to the cells for pH control. In addition HCl is often added to the spent brine from the cells to convert the hypochlorous acid dissolved therein into a recoverable chlorine gas. Of specific interest with regard to the present invention is the role of HCl in certain specialized prior art processes for chlorine purification. For instance, U.S. Pat. No. 3,568,409 discloses that nitrogen trichloride, water, and brine spray can be effectively removed from chlorine through contact with hydrochloric acid having a critical concentration of between twenty and thirty percent by weight. German Pat. No. 878,196 describes a process for water removal from chlorine which involves contact with concentrated hydrochloric acid at a temperature below 0° C. Both of these prior art processes employ solutions having high concentrations of hydrogen chloride expressly for purposes of water removal from chlorine. A dilute aqueous hydrogen chloride solution, as is utilized in certain aspect of the process of the invention, would be detrimental to the accomplishment of this object. No prior art is known to disclose or suggest the purification of electrolytically-produced chlorine through its contact with solutions comprising low concentrations of hydrogen chloride.

SUMMARY OF THE INVENTION

It has now been found that the chlorine product of brine electrolysis contains one or more impurities which have a substantial adverse affect upon its performance in certain organic reactions. It has further been found that these one or more impurities can be effectively eliminated by the action of small quantities of hydrogen chloride, or equivalent combinations of hydrogen and chloride ions, upon the chlorine product.

The invention, in its most important aspects, is a process for improving the quality of electrolytically-produced chlorine by contacting the chlorine with a liquid solution comprising an inert solvent and between about 0.1 and 10.0 percent by weight of hydrogen chloride or of an equivalent combination of hydrogen and chlorine ions, calculated on the weight of the solution. Very advantageously, the invention can be practiced as an improvement upon conventional procedures for cooling and drying of the gaseous crude chlorine product of brine electrolysis through contact with water and sulfuric acid, respectively. In one particular embodiment, by maintaining the specified quantity of hydrogen chloride in the water stream which is, under conventional practice, in direct contact with the electrolytically-produced chlorine during cooling of the gaseous flow from the cells, it is possible to achieve the desired cooling of the chlorine and at the same time satisfy the object of the invention with regard to chlorine quality improvement. In a second embodiment, the invention may, with certain restrictions, be practiced through the addition of hydrogen chloride to the sulfuric acid employed in the conventional chlorine drying procedure.

In yet another embodiment, the invention is a process for improving the quality of electrolytically-produced liquid chlorine by adding thereto between about 5 and 100 ppm by weight of hydrogen chloride. In effect, this embodiment also relates to the elimination of the one or more impurities in chlorine by action of a dilute HCl solution, with the liquid chlorine itself acting here as solvent for the HCl.

The treatment of electrolytically-produced chlorine with hydrogen chloride according to one or more aspects of the invention is found to measurably improve the quality of the chlorine, as indicated by its performance as a reactant in certain organic synthesis reactions.

THE DRAWING

In the attached Drawing,

FIG. 1 depicts a simplified schematic flow diagram of typical procedures conventionally employed in the cooling and drying of the crude chlorine vapor product of brine electrolysis.

FIG. 2 provides illustration of the improvement upon these procedures provided by one embodiment of the invention. Reference will be made to the Figures when this embodiment is described in greater detail in the Examples.

DESCRIPTION OF THE PREFERRED EMBODIMENTS

The electrolytically-produced chlorine which will benefit from application of the process of the invention is that manufactured from sodium chloride brine by the operation of any of the various electrolysis cells which can be classified as of either the diaphragm or the mercury cell type. These two types of cells account for essentially all of the electrolytic chlorine production from brine in the United States. Details of the characteristics and operation of the cells may be realized by reference to numerous publications in the art, for instance, Chlorine—Its Manufacture, Properties and Uses, J. S. Sconce, ed., ACS Monograph Series No. 154, 1962. Whenever the term chlorine appears herein, it is to be understood that its use is solely a matter of convenience and that the term is to be interpreted in all instances to encompass only that chlorine which has been produced from sodium chloride brine by action of diaphragm or mercury type electrolysis cells. As referenced herein, cells of the diaphragm type include the new ion-exchange membrane cells which are currently gaining commercial acceptance.

Suitably, the invention, in one or more of its embodiments, may be applied to the treatment of either a crude chlorine, e.g., a relatively wet or otherwise impure chlorine such as that flowing from the electrolysis cells, and/or a finished chlorine, e.g., that which has been cooled, dried, and optionally liquefied to meet common commercial specifications.

As noted above, in the broadest sense, the object of the invention is the improvement of the quality of a supply of electrolytically-produced chlorine by the elimination of one or more impurities contained therein through the action of hydrogen chloride in dilute solution. The invention provides means for achieving this object for both vapor and liquid chlorine supplies.

Considering first the treatment of chlorine vapor, it is critical to the accomplishment of the object of the invention that the chlorine vapor be contacted with a liquid solution comprising HCl. Contact of the chlorine with HCl in the vapor phase does not effect substantial elimination of the one or more objectionable impurities contained therein. Liquid contact solutions suitable for use in this aspect of the invention contain a solvent which is essentially inert towards the other components of the contact mixture, including the chlorine and HCl, under the conditions at which the contact is performed. The solvent must also be one in which HCl is soluble at a concentration in the range of from 0.1 to 10.0% wt under the contact conditions. Water, which is sufficiently inert to chlorine and other components of the typical contact mixture under conditions of the invention, is considered the most preferred solvent, although its use may be undesirable under certain circumstances, as for example when processing a relatively dry chlorine. The use of water as solvent is also preferably avoided at temperatures below about 10° C. at which solid chlorine hydrate formation would be encountered during chlorine/water contact. Another preferred solvent comprises sulfuric acid of a concentration less than about 75 percent by weight (% wt). Higher concentrations of sulfuric acid in water do not possess the necessary solubility for HCl under usual contact conditions, and use of such higher concentrations is, accordingly, not considered suitable for practice of the invention. When sulfuric acid of between 50 and 75% wt is used as solvent for the liquid contact solution, a low concentration of HCl, e.g., between about 0.1 and 1.0% wt, is preferred. Still another preferred solvent is liquid chlorine. A broad range of other solvents, both polar and non-polar, which have the necessary solubility for HCl and which are essentially inert in the contact system, are also suitable for use in the practice of the invention. For instance, the perhaloalkanes generally, and carbon tetrachloride in particular, have the characteristics required of a solvent for purposes of the invention.

In addition to the HCl and solvent, the liquid contact solution may suitably contain small quantities of other essentially inert components. For instance, the water and sulfuric acid streams which are conventionally used for cooling and drying contact with chlorine vapor and which may be used as contact solution solvents for purposes of the invention, are commonly circulating process streams containing small amounts of components such as dissolved salts, gases, organic chlorides, etc. Preferably, however, the HCl contact solution consists essentially of the solvent and the HCl, by which it is meant that the solution contains less than about 10% of other soluble matter.

Suitable concentrations of HCl in the contact solution are those between about 0.1 and 10% wt. Concentrations between about 0.2 and 8% wt are considered preferred for use in the practice of the invention, and the range from about 0.3 to 5% wt is most preferred. It has been observed that different commercial chlorine supplies, produced in different types of electrolytic cells and/or treated according to different prior art cooling, drying, and purification procedures, contain different levels of the impurity or impurities subject to elimination by practice of the invention. For this reason, and further since there is indication that HCl is itself consumed in the course of elimination of the harmful impurities, no one given content of the HCl in the liquid contact solution can be specified as optimum for all applications of the invention. In this regard it is considered desirable that the HCl content of the liquid contact solution entering the contact zone be in excess of that consumed in accomplishing removal of the impurities during contact with chlorine vapor. Monitoring of the HCl content of the liquid solution withdrawn from the contact zone wherein the chlorine and the liquid contact solution have been contacted according to the invention provides some measure of the performance of the process of the invention. It is desirable that the liquid solution withdrawn from the contact zone contain a measurable quantity of HCl. A concentration of HCl in this solution of between about 0.2 and 2.0% wt is preferred; a concentration of between about 0.3 and 1.0% wt is considered most preferred. Conventional acid/base and oxidation/reduction titration techniques can be used for measurement of HCl concentration in this process stream. While it is, of course, possible to practice the process of the invention without an appreciable excess in HCl in the liquid solution withdrawn from the contact zone, a less effective elimination of the one or more undesirable impurities would then be expected.

It is not critical to the practice of the invention that the HCl contact solution be formed by the addition of hydrogen chloride per se to the solvent. It is critical, however, that the solution comprise either hydrogen chloride as a distinct compound and/or both hydrogen and chloride ions in quantity such that the ions in combination are equivalent to the total presence of HCl in the specified concentration of between about 0.1 and b 10.0% wt. With this in mind, it will be understood that the source of the hydrogen chloride or the individual hydrogen and chloride ions is not critical and that the ions may be separately introduced into the contact solution. For instance, if water is employed as solvent, the HCl contact solution may be suitably formed by the addition to the water of a source of chloride ions, e.g., sodium chloride, and a separate source of hydrogen ions, e.g., a strong acid such as sulfuric. In such a case as this, it is necessary, of course, that the source of the hydrogen ions and the source of the chloride ions both be essentially chemically inert in the contact system other than with respect to their action in eliminating the one or more undesirable impurities. For convenience, the term hydrogen chloride is used broadly herein to designate that the contact solution contains either the specific compound or an equivalent combination of the two ions. The concentrations of HCl specified then refers to the concentration of the compound and/or the ion combination in the contact solution.

In addition to maintaining the specified concentration of HCl in the liquid contact solution, it has also been found desirable to maintain a low solution pH, i.e., very suitably about 2.0 or less. When water is used as a solvent, contact solution pH is preferably between about 0.0 and 1.5; most preferably it is between about 0.4 and 1.0. Adjustment of the pH of an aqueous contact solution to such values is preferably made through the addition of HCl, though other acids may also be employed for this purpose.

Increasing the HCl concentration of the liquid contact solution so that the HCl concentration of the solution leaving the contact is increased to about 1.0% HCl, and decreasing the solution pH, to about 0.6, function to give more rapid and complete elimination of the one or more undesirable impurities in the chlorine. Lower pH or greater concentrations of HCl usually provide no further substantial advantage, although these conditions may be useful if, for instance, very high levels of the impurities are encountered or if vapor-liquid contact is limited.

Contact between the chlorine vapor and the liquid HCl solution is suitably accomplished according to conventional vapor-liquid contact principles. The degree of elimination of impurities by action of the invention is, of course, related to the quality of this vapor-liquid contact. Countercurrent flow of the liquid HCl solution and chlorine vapor through a vertical column equipped with perforated trays, packing, sprays, or like contact means provides a most suitable intimate contact for purposes of the invention. Cocurrent flow of the finely dispersed droplets of the liquid contact solution in chlorine vapor can also provide the degree of contact necessary for adequate performance.

A broad range of process parameters is suitable for use in the contact of gaseous chlorine with an HCl solution to accomplish the object of the invention. Most generally, any combination of temperature and pressure under which the chlorine is a vapor and the HCl contact solution a liquid will be suitable. Temperatures between about 0° and 100° C. and pressures between about 0.5 and 20 atmospheres are preferred. When the contact solution contains significant quantities of water, it is most preferable to operate at temperatures above about 10° C. to suppress chlorine hydrate formation. It is also of advantage to limit operating temperatures on the high side to minimize the potential contamination of the chlorine with HCl vaporized from the liquid solution. For this reason, practice of the invention is such a manner that the HCl contact solution, as it enters into contact with the chlorine vapor, is at a temperature of about 50° C. or less is most preferred.

The one or more impurities in electrolytically-produced chlorine, which are eliminated through the action of this invention, have not been positively identified. While the applicants do not wish to be bound to one theory of operation for their invention, they speculate that the oxides of chlorine are the impurities responsible for observed adverse affects on the performance of organic reactions utilizing a conventional commercial chlorine supply as a reactant. Particularly suspect is chlorine monoxide ($Cl_2O$), believed be present in finished chlorine supplies in a concentration between about 5 and 300 ppm. There are, however, no known reports in the art which teach the presence of chlorine monoxide in the finished chlorine product of brine electrolysis, or suggest significant adverse effects which very small quantities of $Cl_2O$ in the finished chlorine used as a reactant in an organic reaction might have upon selectivity of the reaction to the desired reaction products, or even disclose procedures for determining the presence of very small quantities of $Cl_2O$ in chlorine. The publication by J. J. Renard, and H. I. Bolker entitled "Chemistry of Chlorine Monoxide (Dichlorine Monoxide)" (Chemical Reviews, 1976, Vol. 76, No. 4, pp. 487–508) provides a comprehensive review of the present state of knowledge of the chemistry of $Cl_2O$.

Most advantageously, the contact of chlorine with HCl in aqueous or sulfuric acid solution according to preferred embodiments of the invention can be effected in the course of conventional procedures for the cooling and drying of crude chlorine vapor from electrolytic cells. The examples which follow provide a comparison between one conventional procedure for the cooling and drying of crude chlorine vapor (Example 1) and a modification of this procedure in accordance with the invention (Example 2). Utility for the invention in one practical application is illustrated by Example 3 which compares the performance of the finished products of the cooling and drying procedures of Examples 1 and 2 as reactants in the commercial manufacture of allyl chloride.

COMPARATIVE EXAMPLE 1

For purposes of this comparative example, reference is made to FIG. 1 which depicts, in simplified schematic flow diagram fashion, a particular process of the sort conventionally utilized for cooling and drying of the crude chlorine vapor product of brine electrolysis.

In the operation of the cooling and drying facilities illustrated in FIG. 1, approximately 120,000 lb/hr of a crude chlorine vapor stream 101 flows from a bank of diaphragm type electrolysis cells 11 at a pressure of about one atmosphere. Cooling of crude chlorine from a temperature of about 93° C. to about 35° C. is accomplished by surface heat exchange with 30° C. plant cooling water, without direct chlorine-cooling water contact, e.g., in one or more shell and tube heat exchangers 21. Cooling of stream 101 in exchangers 21 results in the condensation therefrom of a 45,000 lb/hr liquid stream 201, consisting essentially of water but also containing small quantities of other impurities. Cooled chlorine vapor 102 (75,000 lb/hr) from exchangers 21 is routed to the bottom of a chilled water contact tower 31 and therein contacted in countercurrent flow with a circulating chilled water stream 204 (120,000 lb/hr) which is introduced into the top of tower 31. Chilling of chlorine vapor 102 in tower 31 results in further condensation therefrom of a liquid comprising water and other impurities, which is continually withdrawn, together with the circulating stream 204, from the bottom of tower 31 as stream 202. A portion of stream 202, equivalent to the material condensed from chlorine stream 102 through chilling in tower 31, is withdrawn from the process as stream 203 (1000 lb/hr); the remaining portion of stream 202 is circulated, by action of pump 32, through heat exchanger 33 in which it is refrigerated by surface exchange with externally supplied refrigerant. Chilled chlorine vapor 103, at a temperature of about 13° C., flows from the top of tower 31 to two stage sulfuric acid contact in packed drying towers 41 and 42. Chlorine vapor, streams 103 and 104, passes in series through towers 41 and 42 in countercurrent flow with sulfuric acid streams 301 and 302. Concentrated sulfuric acid (95% wt) is introduced into the top of tower 42, and spent sulfuric acid (78% wt) is withdrawn from the bottom of tower 41 as stream 305. Finished chlorine vapor product, 74,000 lb/hr, at a temperature of 35° C., with a water content of about 10 ppm by weight (ppmw), is obtained as stream 105.

EXAMPLE 2

To accomplish the object of the invention with regard to quality improvement in finished chlorine, the conventional cooling and drying procedure of Comparative Example 1 is modified in accordance with a preferred embodiment of the invention. For the purposes of Example 2, FIG. 2 illustrates as much of the schematic flow diagram of FIG. 1 as is necessary to describe this modification of conventional practice.

FIG. 2 depicts the chlorine-chilled water contact tower 31, through which the cooled chlorine vapor 102 (75,000 lb/hr) and a circulating chilled water stream 204a (120,000 lb/hr) are passed in countercurrent contact. For purposes of the invention, process stream 204a, the liquid contact solution, contains 0.60% wt HCl as a result of continuous addition of HCl (conveniently in the form of 30% wt hydrochloric acid) via injection from supply line 401. The pH of the circulating chilled water 204a is 0.6. Stream 202a, the solution withdrawn from the contact zone, contains approximately 0.57% wt HCl. Temperatures and pressures of streams 103a, 202a, 203a, and 204a are essentially the same as those of their counterparts in the Comparative Example 1. Flowrates and compositions of these streams differ from those of their counterparts only with respect to the addition of the relatively small quantity of HCl and the chemical action of the HCl upon impurities in the chlorine stream. Chilled chlorine vapor 103a from tower 31 is dried in towers 41 and 42, according to the conventional drying procedures described in Example 1, to yield a finished chlorine vapor product, 74,000 lb/hr, at a temperature of 35° C., with a water content of about 10 ppm by weight.

EXAMPLE 3

One important end use of electrolytically-produced chlorine in the chemical industry is in the synthesis of allyl chloride. This example presents a representative comparison of the performance of the chlorine product of Example 2 with that of the product of Comparative Example 1 as a reactant for this synthesis.

Allyl chloride is an important intermediate used in the production of a broad range of commercial chemicals for a number of markets, e.g., resins, plastics, medicinal products, surfactants, insecticides, etc. Large scale manufacture of allyl chloride is accomplished by the reaction of chlorine with propylene under conditions which favor substitution of a chlorine atom for hydrogen on the saturated carbon atom of the propylene molecule:

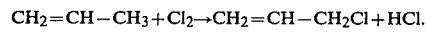

$$CH_2=CH-CH_3+Cl_2 \rightarrow CH_2=CH-CH_2Cl+HCl.$$

Major co-products of this reaction include 1,3-dichloropropene and 1,2-dichloropropane.

As has been reported (Fairbairn, A. W., et al, "Commercial Scale Manufacture of Allyl Alcohol," Chem. Eng. Progr., Vol. 43, June (1947), pp. 280-290), a commercial allyl chloride manufacturing unit can very advantageously be operated in conventional manner to yield a liquid product comprising about 73% wt of allyl chloride and about 24% wt of a mixture primarily consisting of 1,3-dichloropropene and 1,2-dichloropropane in roughly equal proportions. While the dichloropropene/dichloropropane mixture has recognized utility as a soil fumigant (Yabroff, D. L., et al, World Petroleum Congress, Proc. III (1950), Sect. V, pp. 22-30), it is only the dichloropropene which is active for this purpose—the dichloropropane has little value and largely represents a loss of propylene and chlorine starting materials.

In the operation of a commercial allyl chloride manufacturing unit, utilizing as chlorine reactant the electrolytically-produced chlorine which has been cooled and dried according to the conventional procedures of Comparative Example 1, the yield structure of 73% wt allyl chloride and 24% wt of a 1,3-dichloropropene/1,2-dichloropropane mixture (as reported by Fairbairn, supra) is typical. However, it has been observed that if the chlorine product treated in accordance with the invention is substituted for the conventionally treated chlorine as reactant in the same manufacturing unit operated under the same conditions, an increase in the yield of allyl chloride in the liquid product from 73% wt to about 75.5 to 76% wt would typically be realized. Furthermore utilizing the improved chlorine product of the invention, the yield of the 1,3-dichloropropene/1,2-dichloropropane co-product mixture would typically be reduced to about 21% by weight. Most significantly, this reduction in co-product yield is entirely the result of a decrease in the production of its undesirable dichloropropane component; the yield of the valuable 1,3-dichloropropene is not reduced. Thus, the net result of the application of the invention to improve the quality of the chlorine reactant supply in this instance is a significant increase in allyl chloride output.

As a result of the investigation of the performance of a number of different commercial chlorine supplies in allyl chloride manufacture, it is believed that the comparative results set out in this Example are representative for chlorine produced by the electrolysis of brine in diaphragm cells. Mercury cells are found to yield a chlorine characterized by significantly better performance and thus presumably having a lower content of the one or more impurities which are eliminated through operation of the invention. The quality of chlorine produced in mercury cells can still, however, be measurably improved by application of the invention.

It is not intended that Example 3 be interrupted in such a way as to restrict the utilization of the invention to treatment of only those chlorine supplies used as a reactant in allyl chloride manufacture. Rather, Example 3 is presented here as the best way available to illustrate the function of the invention in eliminating the one or more objectionable impurities conventionally found in finished chlorine. Elimination of these impurities may have a greater or lesser impact upon the subsequent performance of chlorine in end-uses other than that illustrated by Example 3.

Furthermore, it is likewise not intended that Example 2 above, presenting a detailed illustration of application of the invention to a particular chlorine cooling procedure, be interpreted as limiting the invention. It will be apparent, for example, that the invention can be practiced in similar manner in the course of any number of known variations of chlorine cooling and drying procedures in which water and/or sulfuric acid are contacted with crude chlorine vapor. For instance, in addition to the chilling of chlorine vapor by water contact as illustrated in Example 1, it is common practice to effect the initial cooling of crude chlorine vapor from about 95° C. to about 35° C. by direct water contact, in which case the water used for this cooling can advantageously be augmented with HCl to form a contact solution suitable for use in the practice of the invention. Furthermore, it is also known to contact the chlorine vapor with 50 to 75% wt sulfuric acid in the course of certain drying procedures. The presence of the specified quantity of HCl in solution in sulfuric acid of this strength serves to accomplish the object of the invention when the solution is contacted with chlorine vapor. However, because of the volatility of HCl from a sulfuric acid solution, a lower range of HCl concentration, i.e., between about 0.1 and 1.0% wt, in the contact solution is preferably used to minimize contamination of the chlorine vapor with HCl.

For a number of reasons, it may be desirable to practice the invention in the context of the last water contact to which the crude chlorine stream is subjected prior to drying. This contact will be performed with water of relatively low temperature, and thus that with the greatest ability to retain HCl in aqueous solution. Since substantial quantities of water and other impurities typically will have been removed from the chlorine in cooling operations upstream of this last water contact, usage of HCl will be minimized by application of the invention in this manner. The use of a circulating HCl contact stream is also desirable for minimizing HCl usage.

HCl may suitably be introduced into the cooling and drying procedures in any convenient manner which will yield a contact solution of specified HCl content. While it will generally be of advantage to add HCl to the water or sulfuric acid before its contact with the chlorine vapor, such is not critical to the success of the invention. One alternative method of forming an HCl contact solution involves the addition of hydrogen chloride vapor directly to the crude chlorine vapor upstream of, or intermediate to, the various cooling and drying contact stages. HCl added in this manner will be absorbed by one or more of the water or sulfuric acid streams with which the chlorine is contacted to yield a suitable HCl contact solution for purposes of the invention.

After the chlorine vapor product of brine electrolysis has been cooled and dried, it is commonly liquefied by well-known techniques. While it is, of course, possible to contact the liquefied chlorine with a liquid HCl solution to accomplish the object of the invention, it is not practical to use certain HCl solvents, e.g. water, for this purpose. Liquid chlorine supplies are almost always a relatively pure, dry, "finished" product. The contact of this product with water and many other solvents is undesirable as it would serve to introduce impurities into the chlorine.

One prefered method for taking advantage of the action of hydrogen chloride upon the impurity in liquid chlorine is through the addition of hydrogen chloride to the liquid chlorine product. The direct addition to the liquid product of between about 5 and 100 ppm by weight HCl, based on the weight of the chlorine, acts to improve the quality of the chlorine. In this embodiment of the invention, the chlorine itself serves as solvent for the HCl. Most suitably for this embodiment the hydrogen chloride is added in the form of a relatively pure anhydrous gas. The HCl may be added i y any convenient means to liquid chlorine supplies having temperatures and pressures customarily encountered in the storage and transport of liquid chlorine.

It should be observed that practice of this aspect of the invention, according to which HCl is added directly to a liquid chlorine, is limited by several considerations. For example, under certain circumstances, small quantities of HCl in liquid chlorine could be considered as undesirable impurity. Furthermore, if the primary impurity eliminated from a dry finished chlorine by action of the invention is in fact $Cl_2O$, then reaction between HCl and Cl$_2$O is likely to release water into the liquid chlorine supply. Such considerations dictate that only very small quantities of HCl, i.e., less than about 100 ppmw, most preferably less than about 50 ppmw, calculated on the weight of chlorine, be added to the liquid product. This in turn limits the most effective application of this aspect of the invention to chlorine supplies having low concentrations of the impurity, such as might be found in chlorine supplies previously treated according to the invention by contact with an HCl liquid solution during cooling and drying, or as might occur in the product of mercury electrolysis cells, which it is believed typically has a lower content of the one or more undesirable impurities than does the product of diaphragm cells. The processing of liquid chlorine according to this aspect of the invention can, of course, be practiced upon chlorine supplies having a relatively high content of the undesirable impurity, in which case only a partial elimination thereof is achieved.

We claim as our invention:

1. A process for improving the quality of a chlorine product of brine electrolysis by removal of impurities contained therein which comprises contacting the chlorine with a liquid contact solution comprising an inert solvent and between about 0.2 and 8 percent by weight of hydrogen chloride or an equivalent combination of hydrogen and chloride ions, calculated on the weight of the solution.

2. The process of claim 1, wherein the chlorine is in gaseous form.

3. The process of claim 2, wherein the inert solvent comprises, in major part, a component selected from the class consisting of (a) water, (b) sulfuric acid of a concentration of less than about 75 percent by weight and (c) chlorine.

4. The process of claim 3, wherein the gaseous chlorine and the liquid contact solution are contacted in a contact zone from which is withdrawn a liquid solution containing between about 0.2 and 2 percent by weight of hydrogen chloride or an equivalent combination of hydrogen and chloride ions, calculated on the weight of the solution.

5. The process of claim 3, wherein the solvent consists essentially of water and wherein the contact is carried out at a temperature of about 10° C. or greater.

6. The process of claim 3, wherein the solvent consists essentially of sulfuric acid of a concentration of less than about 75 percent by weight and wherein the liquid contact solution contains between about 0.1 and 1.0 percent by weight hydrogen chloride or an equivalent combination of hydrogen and chloride ions.

7. The process of claim 5, wherein the pH of the liquid contact solution is less than about 2.0.

8. The process of claim 7, wherein the pH of the liquid contact solution is between about 0.0 and 1.5.

9. In the process in which a gaseous crude chlorine product of brine electrolysis is cooled by direct contact with an aqueous coolant, the improvement which comprises cooling the crude chlorine by direct contact with an aqueous coolant containing in solution between about 0.2 and 8 percent by weight of hydrogen chloride or an equivalent combination of hydrogen and chloride ions, calculated on the weight of the aqueous coolant solution.

10. The process of claim 9, wherein the aqueous coolant contains in solution between about 0.3 and 5 percent by weight of hydrogen and chloride ions, calculated on the weight of the aqueous coolant solution.

11. The process of claim 9, wherein the gaseous crude chlorine product of brine electrolysis is cooled by direct contact with the aqueous coolant in a contact zone from which is withdrawn a liquid solution containing between about 0.2 and 2 percent by weight of hydrogen chloride or an equivalent combination of hydrogen and chloride ions, calculated on the weight of the withdrawn liquid solution.

12. The process of claim 11, wherein the withdrawn liquid solution contains between about 0.3 and 1.0 percent by weight of hydrogen chloride or an equivalent combination of hydrogen and chloride ions.

13. The process of claim 9, wherein the pH of the aqueous coolant is less than about 2.0.

14. The process of claim 9, wherein the pH of the aqueous coolant is between about 0.0 and 1.5.

15. In the process in which a crude gaseous chlorine product of brine electrolysis, said crude chlorine containing water and one or more other impurities, is dried by contact with sulfuric acid having a concentration of less than about 75 percent by weight, the improvement which comprises drying the crude chlorine by contacting in a contact means the crude chlorine with sulfuric acid of less than about 75 percent by weight containing in solution between about 0.1 and 1.0 percent by weight of hydrogen chloride or an equivalent concentration of chloride ions, based on the weight of the sulfuric acid solution, and withdrawing from the contact means a gaseous chlorine having a lesser content of said impurities.

16. A process for improving the quality of a liquid chlorine product of brine electrolysis by removal of impurities contained therein which comprises adding to the liquid chlorine between about 5 to 100 ppm by weight of hydrogen chloride.

17. In the process which comprises a brine electrolysis step in which chlorine is produced and a reaction step in which said chlorine is reacted with propylene to yield allyl chloride, the improvement which comprises contacting prior to the reaction step said chlorine with a liquid contact solution comprising an inert solvent and between about 0.2 and 8 percent by weight of hydrogen chloride or an equivalent combination of hydrogen and chloride ions, calculated on the weight of the solution.

18. In the process which comprises a brine electrolysis step in which a gaseous crude chlorine stream is produced, a cooling step in which said gaseous crude chlorine is contacted directly with an aqueous coolant followed by a drying step in which the gaseous crude chlorine stream is dried through contact with sulfuric acid to produce a chlorine product, and a reaction step in which said chlorine product is reacted with propylene to yield allyl chloride, the improvement which comprises cooling the gaseous crude chlorine by direct contact with an aqueous coolant containing in solution between about 0.2 and 8 percent by weight of hydrogen chloride or an equivalent combination of hydrogen and chloride ions, calculated on the weight of the aqueous coolant solution.

19. In the process which comprises a drying step in which a gaseous chlorine product of brine electrolysis is dried by contact with sulfuric acid having a concentration of less than 75 percent by weight to produce a chlorine product and a reaction step in which said chlorine product is reacted with propylene to yield allyl chloride, the improvement which comprises drying the crude chlorine by contact with sulfuric acid of less than about 75 percent by weight containing in solution between about 0.1 to 1.0 percent by weight of hydrogen chloride or an equivalent concentration of chloride ions, based on the weight of the solution.

20. In the process which comprises a brine electrolysis step in which chlorine is produced in gaseous form, a liquefaction step in which a liquid chlorine supply is prepared from the chlorine, and a subsequent reaction step in which the chlorine is reacted with propylene to yield allyl chloride, the improvement which comprises adding to the liquid chlorine supply between about 5 to 100 ppm by weight of hydrogen chloride, based on the weight of liquid chlorine.

* * * * *